Patented Nov. 17, 1936

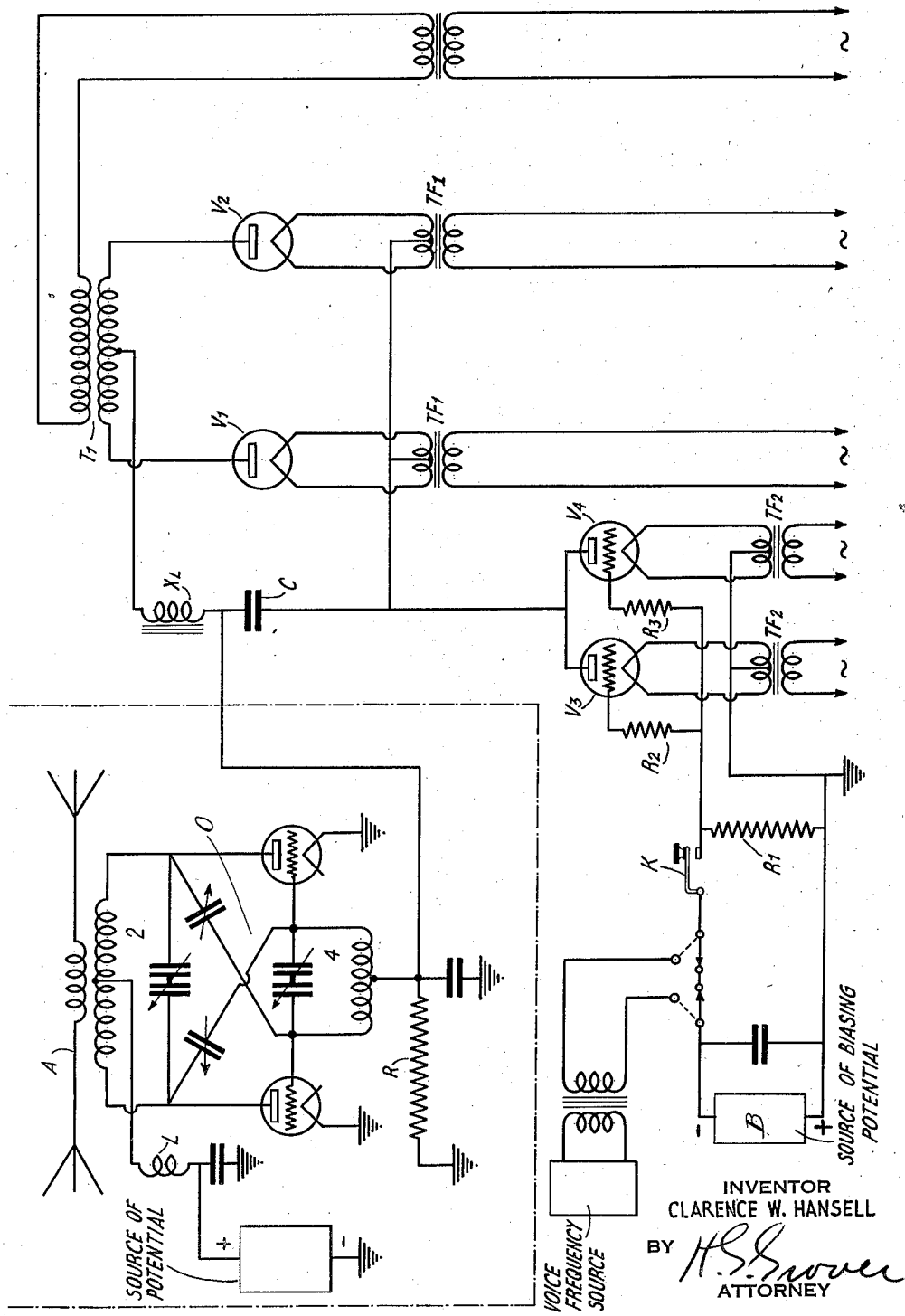

2,060,988

UNITED STATES PATENT OFFICE 2,060,988

KEYING

Clarence W. Hansell, Port Jefferson, N. Y., assignor to Radio Corporation of America, a corporation of Delaware Application May 24, 1933, Serial No. 672,529

1 Claim. (Cl. 250—17)

The present invention relates to signalling systems and more in particular to a novel method of and means for modulating or keying high frequency oscillations. The oscillations may be keyed in accordance with the present invention in the circuit in which they are produced or in the amplifying stages or repeating stages between the point of production and the point of utilization.

The novel features of my invention have been pointed out with particularity in the claim appended hereto.

My method of modulating or keying high frequency oscillations and the means whereby said method may be carried out will be understood from the detailed description which follows and therefrom when read in connection with the drawing, in which the single figure illustrates schematically a signalling means including oscillation producing or relaying means and an arrangement for modulating or keying the oscillations produced or relayed in accordance with my invention.

In the circuit shown it is assumed that oscillations are to be produced and keyed in the producing means, although, as indicated above, it will be understood that the modulating or keying means of the present invention may be associated with stages subsequent to the point of production of the oscillations. In the drawing I have shown an oscillator O comprising a pair of thermionic tubes having their output electrodes connected as shown by way of a tank circuit 2 coupled to a load circuit. The load circuit may be an antenna system A, or it may be the input to an amplifier. The control grids of the oscillators are likewise coupled by way of a tuned circuit 4 including an inductance. Tuned circuit 4 may be tuned to the fundamental frequency, while tuned circuit 2 may be tuned substantially to the fundamental frequency or, if the tubes are used as frequency multipliers having control energy input from a previous stage, the output tuned circuit 2 may be tuned to a harmonic of the fundamental frequency. When the tubes are used as oscillators in the circuit shown the production of oscillations may be insured by interconnecting the anodes and control grids of the tubes by way of variable capacities as shown. Potential for the anode circuits of the tubes is supplied by way of an inductance L connected as shown to the positive terminal of any suitable source, such as a battery, rectifier, or generator, the negative terminal of which is connected to ground.

The frequency determining circuits of the oscillation generator as described above form no part of the present invention and may be as disclosed or may be of any type known.

In the circuit shown negative bias potential for the grid electrodes of the vacuum tubes is supplied by way of a direct current circuit completed between the grids and cathodes of said tubes by way of the resistor R. The value of said resistance is such as to normally bias said tubes to a point at which they produce oscillations most efficiently. The transmitter is modulated or keyed by imposing on the oscillator grids variations in negative potential from the keying circuit at the right of the oscillator, which will now be described as it is used to interrupt said oscillations for telegraph keying.

The modulating or keying circuit shown comprises a pair of rectifiers $V_1$ and $V_2$ connected as shown in a full wave rectifier circuit. This is accomplished by connecting the anodes of tubes $V_1$ and $V_2$ in push-pull relation with the secondary winding of a transformer $T_1$, the primary winding of which is connected to a source of alternating current. The cathodes of tubes $V_1$ and $V_2$ may be supplied with filament heating current from any source, as, for example, the source connected with the transformer $T_1$ by way of transformers $TF_1$. The electrical center of the secondary winding of transformer $T_1$ is connected by way of a reactance $X_L$ to the terminal of the resistance R as shown. The electrical centers of the secondary windings of transformers $TF_1$ are connected as shown to the anodes of a pair of keying tubes $V_3$ and $V_4$. The cathodes of the tubes $V_3$ and $V_4$ may be connected with the secondary windings of transformers $TF_2$, the primary windings of which may be connected with the common alternating current source or with any other source having its voltage properly adjusted. The electrical centers of the secondary windings of the transformers $TF_2$ are connected as shown to ground to one terminal of the resistance $R_1$ and to the positive terminal of the source B. The other terminal of resistance $R_1$ is connected by way of resistances $R_2$ and $R_3$ to the control grids of tubes $V_3$ and $V_4$ as shown. The source B may be connected in parallel with the resistance $R_1$ by way of key or relay K, as shown. The key K may be manually operated or actuated by way of a relay which is in turn controlled by currents over a wire line from a remote point. The alternating currents impressed on transformer $T_1$ are rectified in the tubes $V_1$, $V_2$ and filtered by the action of the inductance $X_L$ and the parallel capacity C. The direct current path of the rectifier includes as shown the resistance R and the internal impedances of the tubes $V_3$ and $V_4$ in series. The internal impedances of the tubes $V_3$ and $V_4$ are variable and may be varied by manipulating the key or relay K.

In operation when the key or relay K is in the lower position, that is, in the position to connect the source B in parallel with the resistance $R_1$, the negative potential applied from the source B to the grids of tubes $V_3$ and $V_4$ biases said grids negatively to a point at which tubes $V_3$ and $V_4$ become non-conductive or are cut off. The impedances of these tubes are in series with the rectifier including the tubes $V_1$, $V_2$ and said rectifier, for this reason, is rendered inoperative so that no negative potential is supplied by the keying circuits to the grids of the oscillators in O. The bias on the grids of the oscillators O is at this time determined by the direct current flowing in the grid cathode circuit of the oscillators due to grid rectification. The elements of the grid circuit of the oscillators O are so chosen that the potential on said grids is such as to produce sustained oscillations of constant amplitude and good energy efficiency in said tubes. When key or relay K is moved into an upper position, that is, removes the source B from the grid circuit, the potential on the grids of tubes $V_3$, $V_4$ becomes zero or less negative and said tubes become conductive. This permits direct current from the rectifier tubes $V_1$, $V_2$ to flow in the series circuit including the impedance of tubes $V_3$, $V_4$ and the resistance R. This impresses a high negative potential on the control grids of the tubes in the oscillators O and biases said tubes to cut off so that said tubes no longer produce oscillations.

Obviously, I may adjust the potential from source B to such a value that partial current flows through the tubes $V_3$, $V_4$, the bias rectifier and the resistance A. Then, by introducing modulating energy in series with source B, for example, by means of a transformer, I may use the system for telephony or modulated telegraphy.

Although my keying system has been shown as applicable to an oscillation generator, it will be understood that I do not intend to limit my keying and modulating circuit to such use since, obviously, the stage O may be an oscillation repeating stage rather than an oscillation producing stage. When oscillations are repeated in stage O rather than produced therein, the same keying results may be obtained by connecting my keying circuit with the grid circuit of the repeater stage in the same manner in which it is connected to the oscillator stage used for purposes of illustration.

An outstanding advantage of my keying and modulating system is that the cathodes of tubes $V_3$ and $V_4$ and one end of their input circuit may be at ground potential. This greatly reduces the amount of insulation required in the input circuit and removes serious limitations to the keying speeds readily obtainable when the transmitter is controlled over a wire line.

Another outstanding advantage when the system is used for ordinary telegraphy is that the stage O is rendered inoperative while current flows from the bias source through the keying or modulating tubes $V_3$, $V_4$. Therefore, fluctuations or ripples in the output of the bias source or in the input control potential to tubes $V_3$, $V_4$ have no effect upon the output from stage O so long as the potential across resistance R is high enough to prevent flow of current in tubes of stage O. When stage O is rendered operative no current flows through resistance R from the bias source and the keying circuits, therefore, can not introduce undesired modulation in the output of stage O.

Having thus described my invention and the operation thereof, what I claim is:

A signalling device comprising, a pair of thermionic tubes having their control grids connected by an alternating current circuit including an inductance, a resistance connected between the electrical center of said inductance and the cathodes of said tubes, said resistance being of such a value that the potential on the control grid of said tubes due to grid rectification of alternating currents in said alternating current circuits permits said tube to repeat or amplify said alternating current, and means for altering the operativeness of said tube at signal frequency comprising, a direct current path in parallel with said resistance, said path including a pair of rectifiers having their anodes connected to the electrical center of said inductance and their cathodes connected to the anodes of a pair of modulating tubes, the cathodes of which modulating tubes are connected to the cathodes of said first named tubes and a source of modulating potentials connected between the control grid and cathodes of said modulating tubes.

CLARENCE W. HANSELL.